Figure 1:
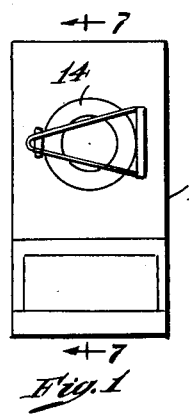

June 30, 1964 W. W. PITTENDREIGH 3,139,273
DRYER
Filed March 22, 1961 2 Sheets-Sheet 1

INVENTOR.
William W. Pittendreigh
BY
Roberts, Cushman & Grover
ATT'YS

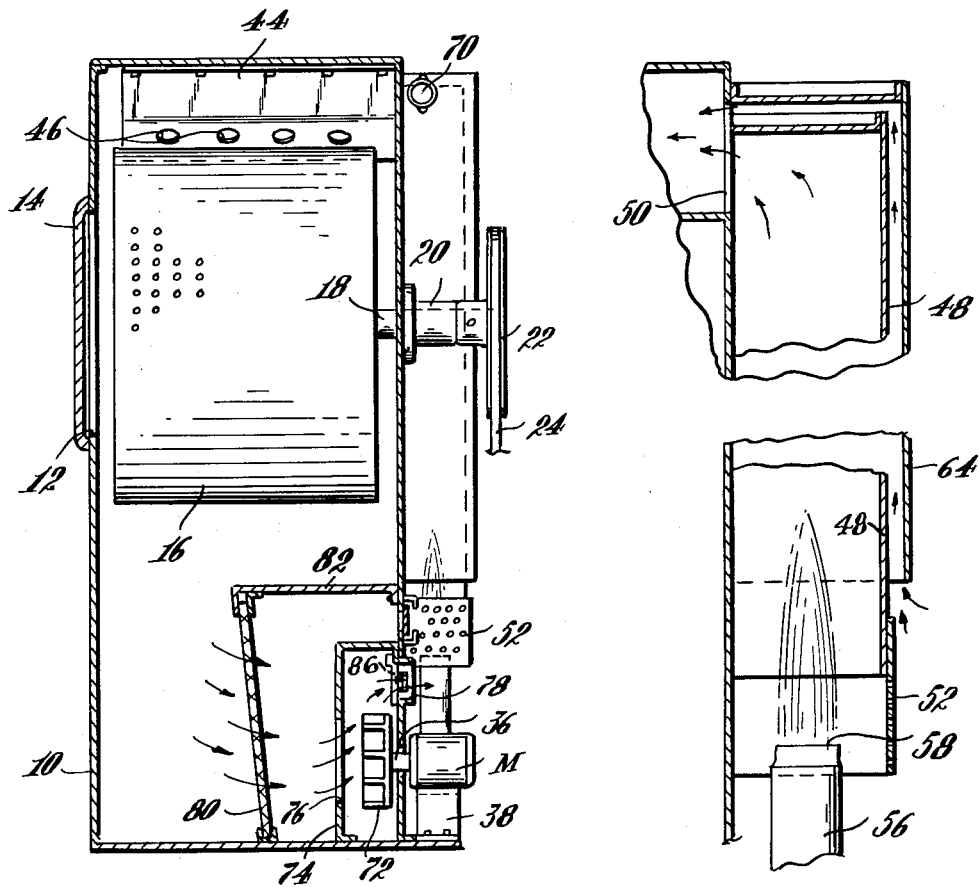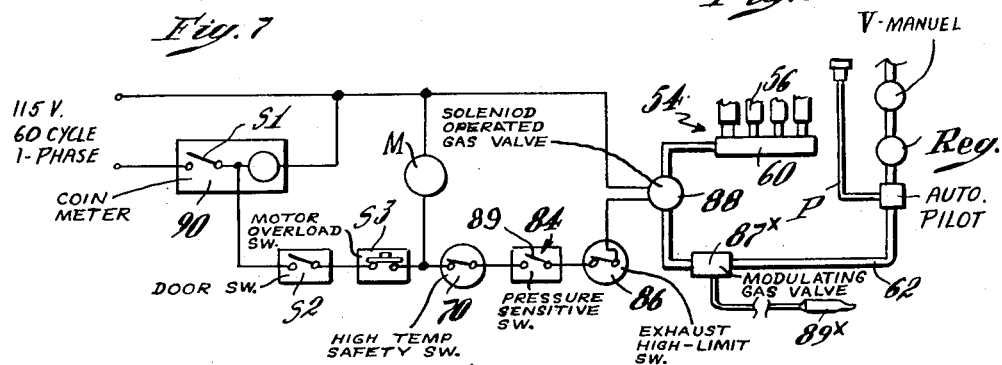

United States Patent Office 3,139,273
Patented June 30, 1964

3,139,273
DRYER
William W. Pittendreigh, New Bedford, Mass., assignor, by mesne assignments, to McGraw-Edison Company Inc., Elgin, Ill., a corporation of Delaware
Filed Mar. 22, 1961, Ser. No. 97,505
19 Claims. (Cl. 263—33)

This invention relates to commercial gas dryers and has for its principal objects to provide apparatus for drying garments rapidly, but without damage thereto; in which the drying temperature may be controlled according to the moisture content; in which temperature control is effected by modulation of a gas flame as distinguished from "on" and "off" control; in which blow-out is minimized; in which combustion is effected under optimum conditions, so as to obtain the maximum heating value per unit of fuel; in which fire hazard within is minimized; in which heat radiation is kept at a level which is not injurious to the personnel; in which positive shut-off of the gas is effected in the event of malfunctioning; and which is comparatively simple to manufacture, economical to use, and requires little upkeep.

As herein illustrated, the dryer comprises a box which constitutes a drying chamber containing a perforated basket, a distributor disposed in the box adjacent the top of the basket, having openings next to the surface of the basket, a vertically disposed combustion chamber at the back of the box having its upper end in communication with the distributor and its lower end open, and mono-port gas burners disposed below the lower end of the combustion chamber with their upper ends at the entrance thereto, the combustion chamber being sufficiently long to effect complete combustion of the gaseous mixture before entering the distributor. The mono-port burners are disposed with their mixing tubes in vertical positions so that the flame rises from the tubes in directions coinciding with the vertically disposed combustion chamber. There is means for monitoring the length of the flame, and the open lower end of the combustion chamber provides means for supplying secondary air to that induced by the burner tubes. A shroud disposed about the combustion chamber in spaced relation to the exterior wall thereof to provide an active air chamber, and this is in communication at its upper end with the distributor. Adjacent portions of the walls of the combustion chamber and shroud contain openings and there is a temperature-sensitive device mounted on the shroud adjacent the hole therein, normally maintained inoperative by flow of air from the outside through the opening into the air chamber. Interference with the flow of air through the apparatus by-passes heated air from the air chamber out through the opening and is effective to terminate full operation of the apparatus. The distributor is situated at one side of the axis of the basket and there are baffles disposed peripherally of the basket at the opposite side of the axis which cause air from the distributor to flow from top to bottom around and through that portion of the basket bounded by the baffle plates. An exhaust fan is situated at the bottom of the box within the housing which is operable to set up a flow of drying air from the distributor through the basket, discharge the spent air from the bottom, and to maintain a slight negative pressure in the drying chamber. An element sensitive to air pressure is situated at the underside of the basket and a temperature-sensitive device, at the discharge opening, provides for terminating operation by turning off a gas valve when the apparatus is malfunctioning, as indicated by the absence of negative pressure in the drying chamber, or a rise in temperature of the exhaust air.

Figure 2:
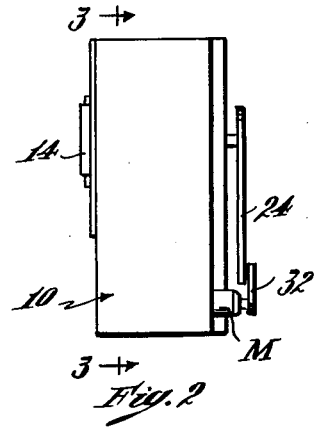
Figure 5:
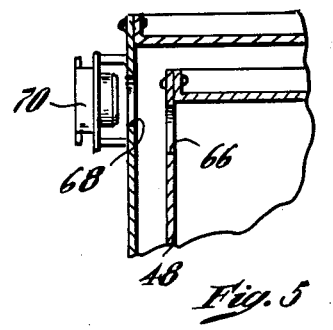
Figure 3:
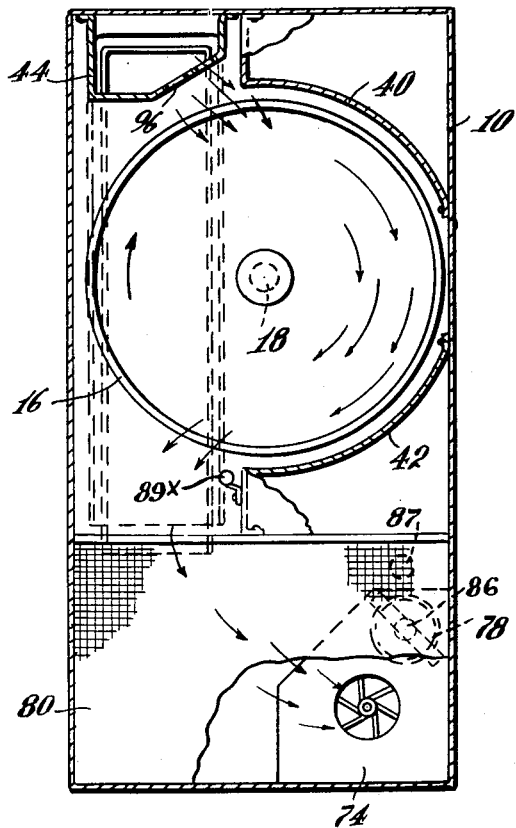
Figure 4:
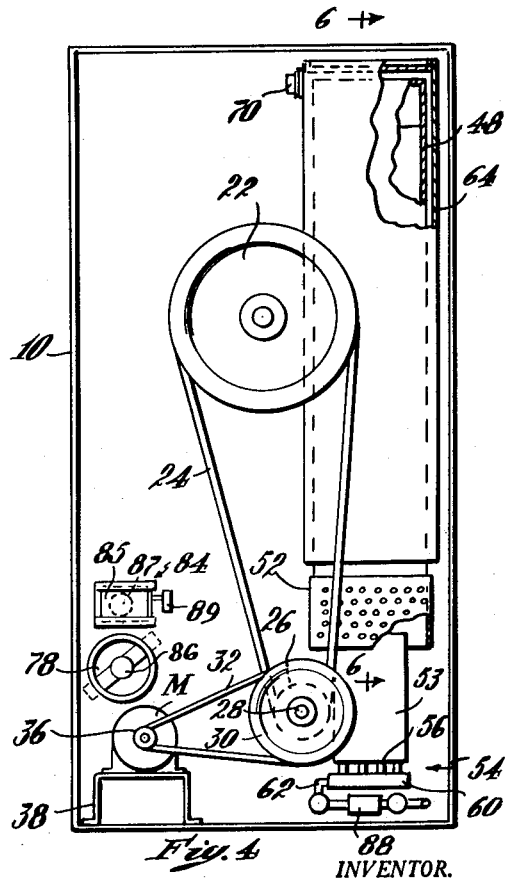

The invention will now be described in greater detail with reference to the accompanying drawings wherein:

FIG. 1 is a front elevation of the dryer;
FIG. 2 is a side elevation;
FIG. 3 is a vertical section taken on the line 3—3 of FIG. 2, to much larger scale;
FIG. 4 is a rear elevation broken away in part in the same scale as shown in FIG. 3;
FIG. 5 is a fragmentary vertical section at the upper ends of the combustion and air chambers adjacent the temperature-sensitive shut-off;
FIG. 6 is a vertical section taken on the line 6—6 of FIG. 4;
FIG. 7 is a vertical section taken on the line 7—7 of FIG. 1; and
FIG. 8 shows the piping for supplying gas to the burners in combination with a schematic wiring diagram for controlling the supply of gas to the burners.

Referring to the drawings, the dryer comprises a sheet metal box 10 which constitutes the drying chamber, having a circular opening 12 (FIG. 7) in its front wall which is adapted to be closed by a door 14 during the drying cycle. Behind the opening 12, within the box, there is a perforated basket 16 which is open at its forward end, mounted for rotation about a horizontal axis on the forward end of a shaft 18, the latter being supported in the rear wall of the box by bearings 20 and having fastened to its rearwardly projecting end a pulley 22 by means of which the shaft and hence the basket may be rotated. Rotation of the shaft is effected by a belt 24 entrained at its upper end about the pulley 22 (FIG. 4) and at its lower end about a pulley 26 fast to a shaft 28. The shaft 28 has fixed to it a pulley 30 and the latter is driven by a belt 32 entrained about it and about a pulley 34, fastened to the shaft 36 of a motor M. The motor M is bolted to a bracket 38 at the base of the box, exteriorly thereof, as shown in FIGS. 4 and 7. The interior of the box is provided with baffles 40 and 42 (FIG. 3) which are concentric with the basket, are spaced therefrom and extend from the top of the box substantially vertically above the axis of the basket to the underside of the basket, substantially vertically below the axis, at one side of the basket only. A distributor 44 is mounted within the box at the top, at the opposite side of the axis of the basket from the baffles, extends lengthwise of the basket, and has openings 46 along one side adjacent the top of the basket.

A combustion chamber 48 is mounted on the back of the box at one side, as shown in FIGS. 3 and 4, and comprises a straight hollow conductor of uniform, substantially rectangular horizontal section. The upper open end of the conductor is in communication with the distributor 44, through an opening 50 in the back wall. The lower end of the combustion chamber is open and a perforated skirt 52 is fastened thereto and extends downwardly therefrom over the upper end of a chimney 53. To achieve the best performance throughout the range of heat delivery the combustion chamber should be approximately five feet long. A burner assembly 54 is mounted below the lower end of the chimney and is comprised of one or more mono-port gas burners 56 disposed in vertical position with their upper ends 58 situation within the chimney. The burner tubes 56 are set into a manifold 60 which is supplied with fuel through a pipe 62.

A shroud 64 comprising a straight hollow conductor of uniform, substantially rectangular cross-section is disposed about the combustion chamber 48 so as to provide, in conjunction with its exterior wall, an active air chamber. The upper end of the shroud is in communication with the distributor through an extension of the opening 50 and the lower end terminates short of the lower end of the combustion chamber.

By disposing the combustion chamber and burners in vertical positions, and making the combustion chamber approximately five feet long, advantage may be taken of the natural upward flow and divergence of the flames to effect a complete diffusion and mingling of the products of combustion with an excess volume of secondary air drawn in at the lower end of the combustion chamber without recirculation so that all drying air is uniformly diluted when delivered to the distributor. Furthermore, with the burners arranged to deliver the fuel in the vertical direction of flame gravity and air flow, distortion of flow is eliminated, more expansion of the gas energy is possible, and maintenance of the flames, regardless of their length, may be effected without danger of blow-out. In fact, the fuel input may be infinitely graduated from a maximum down to about 30% without danger of blow-out and with efficient combustion. Sensitive modulation of the flames to control the temperature response makes it possible to take full advantage of high volume, high temperature input when the garments are protected from the high heat by the cooling effect resulting from the evaporation of moisture from the garment and yet permits safe drying when the moisture content is low, and the cooling effect is at a minimum by reducing the input proportionately. Greater flame stability at fractional input and stability within high volume forced drafts are also realized by such upright disposition of the burner tubes. The shroud disposed about the combustion chamber provides a forced air flow which insulates the combustion chamber so that there is no danger of fire or injury to the environment or to personnel, and additionally provides a source of warm air which is comingled with the mixed air and products of combustion from the combustion chamber.

Forced flow of air through the apparatus is effected in such a manner as to maintain a slight negative pressure therein during normal operation. This is attained by taking advantage of the fact that the combustion chamber is relatively long and of relatively small cross-section, so that flow to the drying chamber is limited, and by employing a high capacity exhaust fan. The exhaust fan 72 is mounted at the bottom of the box adjacent the back on the forward end of the shaft 36 of the motor M. A trunk houses the fan and has an intake opening 76 and a discharge opening 78. By maintaining the drying chamber, that is, the interior of the box at a slight negative pressure, the boiling point of the moisture is lowered, the latent heat of evaporation is reduced and the moisture is more effectively drawn out of the fibers. A still further advantage in operating at a negative pressure is that any leakage takes place into the box and hence if unburned gases or products of combustion are present due to malfunctioning, they are exhausted without harm.

A lint baffle 80 is disposed within the box transversely thereof, in front of the trunk 74, and secured in an upright position by a plate 82 to prevent lint from being drawn into the exhaust fan and being discharged adjacent the burners.

When operating at high heat and high fuel volume it is of extreme importance to have a safety control which will respond rapidly throughout a relatively long range of temperature; accordingly openings 66 and 68 are provided in the side walls of the combustion chamber and shroud adjacent their upper ends (FIGS. 4, 5 and 7) and a high temperature safety switch 70 is mounted on the exterior side of the shroud over the opening 68, the switch being operatively connected, as will appear hereinafter, to shut-off the apparatus when the temperature of the air in the chamber reaches a predetermined amount under abnormal conditions. The switch operates at 200° or less than one-half of the temperature normally present within the combustion chamber. It is set at a distance of 3/16 of an inch from the opening 68 so as to be out of contact with any conductive or radiating surface. When the dryer is functioning normally, flow of the products of combustion and air in the combustion chamber and air chamber is such as to induce a flow of air from the outside inwardly through the opening 68 and hence to keep the switch 70 cool. If the inward flow stops due to absence or blocked air through the dryer, heat from within the air chamber and the combustion chamber escapes through the openings 66 and 68 against the switch 70 effecting its operation, so as to effect operation of a solenoid-operated gas valve 88. By placing the switch 70 on the wall of the air chamber rather than the combustion chamber, shut-down will take place at a temperature lower than that which exists in the combustion chamber under normal operating conditions and hence before any damage is caused. Safety limit may result from such other factors as exhaust fan failure, a clog in the lint screen, excessive gas volume, failure of the door switch, clogging of the exhaust port and the like.

A pressure-sensitive device 84 is mounted in the back wall of the box near the exhaust opening which is in the form of a hinged damper 85 disposed at the outside of the box over an opening 87 in the wall. As long as a sufficient negative pressure exists within the box the damper is held closed. If, for some reason, the pressure becomes insufficiently negative or positive, the damper swings open and simultaneously closes a switch 89. The switch 89 energizes the solenoid-operated gas valve 88, so as to shut-off the gas burners. The pressure-sensitive device responds only to a negative pressure within the drying chamber hence it will operate to re-open the gas valve only when there is a negative pressure and this, of course, necessitates the existence of an updraft in the combustion chamber. Thus the gas burners cannot be re-ignited in the absence of an updraft in the combustion chamber and there will be no danger of flame roll-out, that is, incomplete combustion or confinement due to lack of draft.

An exhaust high-limit switch 86 is mounted adjacent the discharge opening 78 and this is operable, when the temperature of the exhaust air exceeds a predetermined amount, to effect operation of the solenoid control gas valve 88 which shuts off the gas burners. The switch is a bimetallic disc-type thermostat set to operate at 200° F. and will respond when the temperature reaches 200° F. at the exhaust for reason of malfunctioning in gas input, modulation or for any of the reasons mentioned above.

There is a thermostatic modulating gas valve 87x in the gas line (FIG. 8) to the burners which is operable to modulate the flame by controlling the amount of gas supplied thereto. A self-powered sensing element 89x, is situated within the drying chamber on the lower baffle adjacent the underside of the basket, responsive to temperature of the air within the dryer after passing through the basket and load to effect flow adjustment of the gas valve. The purpose of modulating the gas flame is to prevent the high input temperature which results from full rated gas flow from being applied to the garments or fabrics within the basket when the moisture content is low or when the garments are substantially dry. Accordingly, gas flow is automatically regulated to reduce the input flow in proportion to the lowering of the moisture content and temperature of the garments. During changing conditions of the drying cycle any incorrect excess of input heat is prevented by the exhaust temperature switch 86.

The sensing switch is of the kind having a capillary tube charged with a liquid which will vaporize and, by expanding a bellows, close the gas valve port. Such devices are manufactured by and are available commercially from Robert Shaw-Fulton or Minneapolis-Honeywell Regulator Company.

Referring to FIG. 8, power is supplied from a 115 volt, 60 cycle, 1 phase power supply. A coin meter 90 is employed to initiate operation of the apparatus by closing of a switch S1. A door switch S2 is connected in series with the coin switch so that operation of the apparatus will start only when the door is closed. If the door is closed, the motor M will start and hence effect rotation of the basket and the exhaust fan. An overload switch S3 is in series with the motor so that if the load is excessive, or of a character unlike wet garments, the circuit will be automatically broken. The exhaust fan will set up a negative pressure in the drying chamber and will close the switch 84 which, in turn, will energize the solenoid-operated gas valve 88, so as to supply gas to the burners, which will immediately be ignited by the pilot p which is independently controlled. It is to be observed that the switches 70 and 86 are in series with the pressure switch 84 and are normally closed since the temperature at the beginning of the operation is much below that which would effect their operation. After operation has been started, an abnormal rise in temperature, either at the entrance to the drying chamber, or at the exhaust, will open the switches 70 and/or 86 to cut-off the supply of gas.

The dryer has the following advantages to wit: that it has contained and enclosed gas combustion within a combustion chamber and hence eliminates exposure of panels and other building materials having contact with its top and sides to temperatures capable of causing combustion thereof; that there is a complete blending of the entire air flow and heat of fuel before it enters the drying chamber so that the drying air is of uniform temperature and the sensing devices respond more precisely; and that the vertical combustion chamber provides the means for modulating the front flame and its combustion so as to permit complete control of the entire volume of air passing into the dryer.

It should be understood that the present disclosure is for the purpose of illustration only and that this invention includes all modifications and equivalents which fall within the scope of the appended claims.

I claim:

1. A dryer comprising a standing cabinet within which there is a perforate rotatable basket and a distributor for supplying a drying medium to the basket, said cabinet having a rear wall containing an entrance opening above the basket through which a drying medium is introduced into the distributor within the cabinet, and means externally of the cabinet for producing a drying medium comprised of a mixture of hot gases of combustion and preheated fresh air, said means comprising a vertically disposed, first hollow conductor having open upper and lower ends and an interior of substantially uniform horizontal section, said first conductor being secured to said back wall externally of the cabinet, with its open upper end partially covering said entrance opening in said back wall, a perforated skirt of substantially the same cross-section as said first conductor secured to the open lower end of said first conductor, said skirt having an open lower end, a burner situated below the lower open end of said skirt, said burner having a plurality of vertical, spaced parallel jet tubes, the upper ends of which extend into the lower open end of the skirt so that the flame propagation of each jet is situated within the lower end of said first conductor, and the major portion of the length of said first conductor being adapted to be situated above the flame, and a vertically disposed, second hollow conductor having open upper and lower ends, and an interior which is of substantially uniform horizontal section, said second conductor being mounted on said back wall so as to enclose said first conductor, the open upper end of said second conductor closing the remainder of said opening in said back wall, and the lower end terminating short of the lower end of said first conductor, and the walls of said conductors being spaced from each other and forming a passage through which fresh air from externally of the dryer is induced to flow upwardly and is preheated by contact with said first conductor for mixing with the products of combustion in said distributor.

2. A dryer according to claim 1, wherein the cabinet has an exhaust opening situated below the basket and a switch situated in the cabinet adjacent the exhaust opening operative to discharge air through the exhaust opening at such a rate as to maintain a slight negative pressure in the dryer chamber.

3. A dryer according to claim 1, wherein there is a conduit for supplying gas to the burner and a modulating valve situated in the conduit adapted to vary and control the quantity of gas flow to the burner.

4. A dryer according to claim 1, wherein there is a conduit for supplying gas to the burner, a modulating valve situated in the conduit operable to control flow of the gas to the gas burner, a sensing device situated in the chamber adjacent the basket, and means connecting the sensing device to the modulating valve operative, according to the resultant temperature of air passing through the basket and load therein, to effect adjustment of the modulating valve.

5. A dryer according to claim 1, wherein there is a modulating valve operable to control the flow of gas to the gas burner, and a sensing device situated in the drying chamber adjacent the lower side of the basket for effecting adjustment of the modulating valve according to the resultant temperature of the air after passing through the basket and load therein, and means operatively connecting the sensing device to the modulating valve.

6. In a dryer, a dryer chamber containing a perforated basket, a distributor disposed in said dryer chamber adjacent the top of the basket having openings next to the surface thereof, an external, vertically disposed combustion chamber at the back of the dryer chamber having its upper end in communication with the distributor and its lower end open, a shroud disposed about the combustion chamber providing, in conjunction with the exterior side, an air chamber of substantially coextensive length, said shroud having communication with the distributor at the top and being open at its bottom, said combustion chamber and said shroud containing openings in adjacent portions of their walls near the top, a heat-sensitive element, bracket means fixed to the shroud, said bracket means supporting the heat-sensitive element externally of the shroud opposite the last-named opening therein, said element being normally acted upon by air induced from the outside through the openings by the updraft in the air chamber, and being operable by heating issuing from the air chamber outwardly through the openings when normal air flow is blocked, to terminate operation of the gas supply.

7. In a dryer, a dryer chamber containing a perforated basket mounted for rotation about a horizontal axis, means for effecting rotation of the basket in a predetermined direction, a distributor disposed in the dryer chamber adjacent the top of the basket at one side of the axis of rotation, a baffle at the other side of the axis of rotation concentric with one-half of the wall of the basket at that side, said baffle commencing at the top and terminating at the bottom at that side, and leaving the opposite side open to the chamber, said basket rotating downwardly relative to the baffle and upwardly relative to the side exposed to the interior of the chamber, an air pump situated in the chamber below the lower half of the baffle adjacent the rear wall of the chamber operable, in conjunction with the rotation of the basket, to draw air and products of combustion from the distributor downwardly along a curved path concentric with the axis of rotation of the basket at the baffle side and through the basket to the lower side of the baffle to discharge the mixture at the bottom and to maintain a slight negative pressure in the dryer chamber.

8. A dryer according to claim 7, wherein there is a gas burner including means for supplying gas thereto for supplying heated air to the basket, characterized in that a pressure-sensitive switch is situated within the chamber adjacent the exhaust opening, and there is means operably connecting the switch and the means for supplying gas operative, in response to operation of the switch in the absence of a negative pressure, to terminate operation of the means for supplying gas.

9. A dryer according to claim 1, wherein said first conductor is a combustion chamber, is relatively long in comparison to the maximum length of the flames of the burner, and the entire length is situated above the upper ends of the burner tubes.

10. A dryer according to claim 1, wherein the first conductor is a combustion chamber and is in the order of five feet in length.

11. A dryer according to claim 1, wherein the first conductor is a combustion chamber and there is means in communication with the open upper end of said first conductor operative to maintain a slight negative pressure in the combustion chamber.

12. A dryer according to claim 1, wherein the first conductor is a combustion chamber, the gas burner jets are distributed in uniformly spaced relation with their ends vertically subjacent the lower end of the combustion chamber, and there is means in communication with the open upper end of said first conductor operative to induce air into the lower open end of the combustion chamber in a direction adapted to be parallel to the flames and in a direction and at a rate such as to effect flame propagation without interference or cross-over impingement of unburned products of combustion.

13. A dryer according to claim 1, wherein the first conductor is a combustion chamber, the gas burner jets are distributed in uniformly spaced relation within the combustion chamber, the latter being of sufficient cross-section to provide for free flow of air into and around the burner jets, and there is means in communication with the open upper end of said first conductor operative to induce a large volume of air into the combustion chamber in intimate association with the flames.

14. A dryer according to claim 1, wherein the first conductor is a combustion chamber which is of sufficient cross-section adjacent the burner jets to provide for free flow of air thereinto and about the burner jets, and there is means in communication with the open upper end of said first conductor operative to induce a flow of air into the combustion chamber in excess of that required for complete combustion.

15. A dryer according to claim 1, wherein the first conductor is a combustion chamber which is of sufficient cross-section adjacent the burner jets to provide for free flow of air thereinto about the burner jets, and there is means in communication with the open upper end of said first conductor operative to induce a flow of air into the combustion chamber for mixing with the flame energy.

16. A dryer according to claim 1, wherein the first conductor is a combustion chamber which is of sufficient cross-section adjacent the burners to provide for free flow of air thereinto about the burner jets, and there is means in communication with the open upper end of said first conductor operative to induce air into the combustion chamber in sufficient quantity and in such a direction as to enhance flame propagation of each burner jet independently of the other, to provide an excess of air over that required for complete combustion and to effect complete mixing of the air and flame energy.

17. A dryer according to claim 6, wherein the bracket means supports the heat-sensitive element spaced outwardly from the wall of the shroud in concentric relation to said last-named opening out of contact with the heat-conducting and/or radiating surfaces.

18. A dryer according to claim 1, comprising means for effecting rotation of the basket in a predetermined direction, said distributor being disposed in the dryer chamber adjacent the top of the basket at one side of the axis of rotation, baffles at the other side of the axis of rotation concentric with the wall of the basket at that side, said basket rotating downwardly at the baffled side, and an exhaust pump below the basket operable to draw the mixed air and products of combustion from the distributor downwardly around the baffle side and through the basket to the lower side and to discharge it from the dryer chamber at the bottom.

19. In a dryer, a dryer chamber containing a perforated basket mounted for rotation about a horizontal axis, a distributor disposed in said dryer chamber adjacent the top of the basket, a vertically disposed relatively long combustion chamber of straight substantially uniform cross-section disposed exteriorly of said dryer chamber and having its upper end in communication with the distributor, baffle means partially enclosing one side of the basket, said basket rotating downwardly relative to the enclosed side thereof and upwardly relative to the side exposed to the interior of the chamber, and an air pump situated in the chamber below the enclosed side of the basket, the intake side of said pump being in communication with the interior of the dryer chamber and operable to exhaust the moisture laden air from the bottom of the dryer chamber at such a rate as to maintain a negative pressure in the apparatus throughout the dryer chamber and the combustion chamber.

References Cited in the file of this patent

UNITED STATES PATENTS

| | | |
|---|---|---|
| 2,498,172 | Minter et al. | Feb. 21, 1950 |
| 2,506,517 | Moore | May 2, 1950 |
| 2,604,313 | Grantham | July 22, 1952 |
| 2,716,820 | Bourner | Sept. 6, 1955 |
| 2,852,241 | Jackson | Sept. 16, 1958 |
| 2,867,430 | Hullar | Jan. 6, 1959 |
| 2,917,239 | Matthews | Dec. 15, 1959 |
| 2,919,750 | Cobb | Jan. 5, 1960 |
| 3,022,987 | Thorsheim | Feb. 27, 1962 |
| 3,045,993 | Sidaris | July 24, 1962 |